United States Patent [19]

Fenaux

[11] Patent Number: 4,734,030
[45] Date of Patent: Mar. 29, 1988

[54] APPARATUS FOR THE TREATMENT OF FLUE GASES

[76] Inventor: Lucien Fenaux, Rijksweg 57, 8720 Kuurne, Belgium

[21] Appl. No.: 916,482
[22] PCT Filed: Jan. 21, 1986
[86] PCT No.: PCT/BE86/00001
  § 371 Date: Sep. 22, 1986
  § 102(e) Date: Sep. 22, 1986
[87] PCT Pub. No.: WO86/04257
  PCT Pub. Date: Jul. 31, 1986

[30] Foreign Application Priority Data

Jan. 22, 1985 [BE] Belgium .............................. 2/60595

[51] Int. Cl.$^4$ .............................. F23J 3/00; F23C 9/00
[52] U.S. Cl. .............................. 432/72; 110/205; 110/216; 422/205; 422/168; 159/4.2; 55/DIG. 14
[58] Field of Search .................. 432/72; 110/205, 216; 422/168, 173, 205; 55/92, 269, 471, DIG. 14; 208/48 Q; 159/4.2

[56] References Cited

U.S. PATENT DOCUMENTS

| | | | |
|---|---|---|---|
| 2,194,666 | 3/1940 | Meissner | 422/205 |
| 2,582,899 | 1/1952 | Bannebey et al. | 422/205 |
| 3,395,990 | 8/1968 | Ballestra | 422/205 |
| 3,432,273 | 3/1969 | Kono et al. | 159/4.2 |
| 3,473,896 | 10/1969 | Halder et al. | 422/205 |
| 3,884,643 | 5/1975 | Ballestra et al. | 422/205 |
| 3,921,397 | 11/1975 | Maldonado | 422/168 |
| 3,928,536 | 12/1975 | Lewis, Jr. | 423/242 |
| 4,584,000 | 4/1986 | Guest | 159/4.2 |

FOREIGN PATENT DOCUMENTS 241602  10/1925  United Kingdom ......... 55/DIG. 14

Primary Examiner—Henry C. Yuen
Attorney, Agent, or Firm—Schwartz, Jeffery, Schwaab, Mack, Blumenthal & Evans

[57] ABSTRACT

An apparatus for the treatment of flue gases is provided having an upright vessel with a generally cylindrical wall, two spaced cooling circuits, the inner surface of the wall, an inlet port for introducing flue gases into the vessel, a fan for forcing the introduced flue gases radially outwardly against the inner surface of the vessel, and an outlet port for outletting the dedusted flue gases. The force of the impact of the introduced flue gases against the inner surface of the vessel causes dust particles in the flue gases to remain on the inner surface while the dedusted gases are outletted through the outlet port. The outlet port has an inlet opening located substantially centrally of the vessel and spaced relatively closely below the fan. The upright vessel can be provided with a number of cooling fins which extend helically in the same direction as the direction of rotation of the fan.

10 Claims, 2 Drawing Figures

APPARATUS FOR THE TREATMENT OF FLUE GASES

This invention relates to an apparatus for the treatment of flue gases, more particularly to an apparatus for dedusting industrial flue gases.

In a special embodiment the apparatus according to the present invention is especially suited for being used as a smoke filter in the combustion of, e.g., lignite (called also brown coal), wherein, first of all, dedusting of flue gases is provided and secondly also the major part of sulphur is removed from said gases.

A known apparatus for the treatment of flue gases which has the nearest resemblance to the apparatus according to the present invention is the classical cyclone separator or dust extractor. In such a cyclone separator the flue gases are substantially tangentially fed into an upright cylindrical vessel, wherein they first describe a helical path along the cylindrical wall and finally ascend again in the vessel and disappear through a central outlet.

By the helical motion of the flue gases the largest dust particles contained therein are pressed against the cylindrical wall by the centrifugal force, whereafter they fall down and are collected at the bottom of the vessel in a funnel-shaped space or in a filter.

The disadvantage of such a known cyclone separator is that only the heavier dust particles are thrown against the side wall of the vessel and then removed.

The lighter dust particles, however, are readily removed along with the flue gases through the outlet and hence get into the atmosphere, whereby a serious pollution of the environment may arise.

In order to do away with this disadvantage, the present invention provides an apparatus for the treatment of flue gases, whereby, on the one hand, large as well as small dust particles are removed from said flue gases and, on the other hand, said flue gases can be desulphurised, if necessary.

Actually, this desulphurisation takes place indirectly by the neutralisation of the acids formed with the sulphur. This results therein that the apparatus is not corroded by said acids and that no pollution of the environment by acids arises either.

The apparatus according to the present invention having the above-mentioned advantages mainly consists of the combination of a vessel provided with an inlet opening for the flue gases, an outlet opening for the flue gases, a cooled wall, means for cooling the latter, means for forcing the entering flue gases to come into contact with said cooled wall, and an outlet for discharging the residual product from the flue gases to be treated.

Further, the supply tube of the apparatus is provided with an inlet through which means can be introduced for neutralising the acids formed from sulphur.

In order to better show the features of the present invention, a preferred embodiment is described hereinafter as an example without limiting the scope thereof and with reference to the accompanying drawings wherein.

Figure 1:
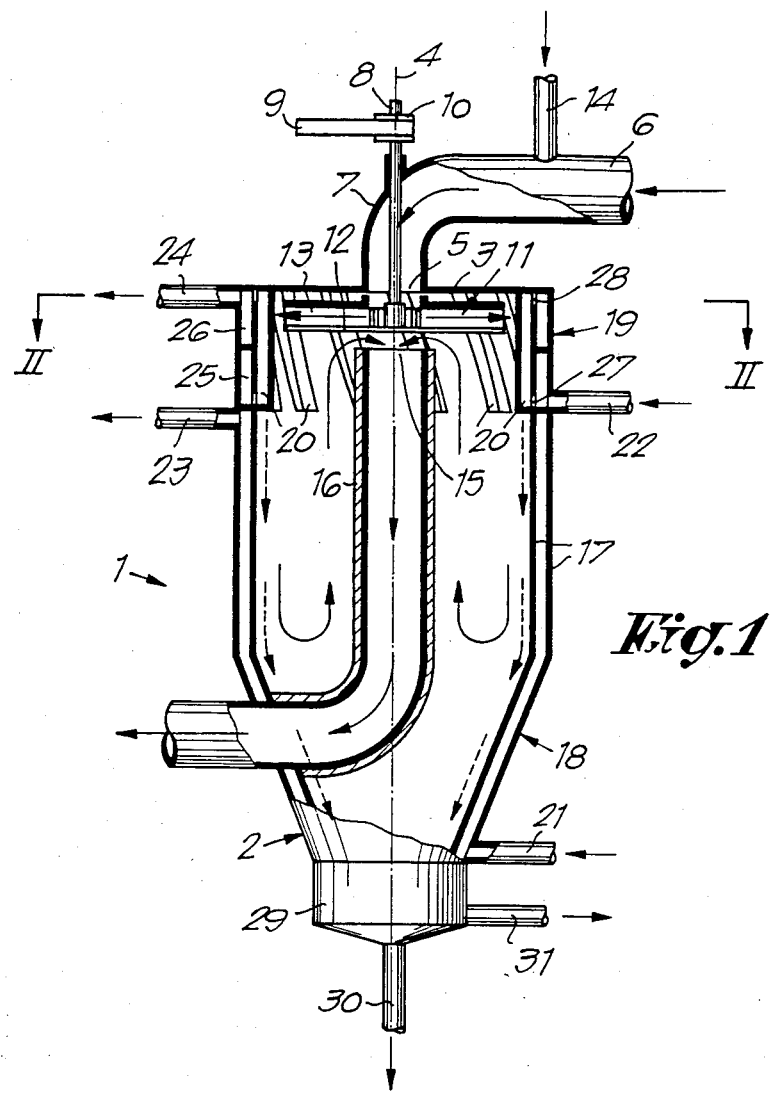
FIG. 1 represents a partial section of the apparatus according to the present invention.

As represented in the figures, the apparatus according to the present invention mainly consists of an upright cylindrical vessel 1 which at its bottom preferably tapers off to a funnel-shaped end 2.

At the flat top side 3 of vessel 1, in the axis of symmetry 4, an inlet opening 5 is provided, through which the flue gases are brought into said vessel 1 via a supply tube 6.

Just outside vessel 1 said supply tube 6 has a bend 7 giving passage to a shaft 8, which on the one hand extends outside the interior of the apparatus and there is driven by means of a belt 9 and a pulley 10, and on the other hand, at its other end which extends to the interior of vessel 1, bears a fan 11 finding itself just below the inlet opening 5.

The axis of rotation of shaft 8 coincides with the axis of symmetry of vessel 1.

Fan 11 mainly consists of two horizontal circular plates 12 between which a plurality of vertical blades 13 are applied, the top plate being provided with a central opening closely fitting against the inlet opening 5 for the flue gases.

According to the embodiment represented in the figures, said blades 13 extend radially with respect to said shaft 8. Likewise, the blades 13 do not continue below the inlet opening 5.

Besides, an inlet 14 is made in supply tube 6 whose purpose will appear further below from the description of its operation.

For allowing the flue gases to escape from vessel 1, a central outlet opening 15 is provided through which the gases can be discharged into the atmosphere via a flue 16 through the side wall 17 of vessel 1.

According to the present invention the apparatus is equipped with means for cooling the side wall 17 of vessel 1. Said means consist of two separate cooling circuits 18-19 and a number of cooling fins 20 in the embodiment represented in the figures.

Both cooling circuits 18-19 are mainly formed by side wall 17 which is double-walled and each cooling circuit is provided with an inlet 21 and 22 respectively and an outlet 23 and 24 respectively, allowing the circulation of a cooling medium, e.g. water, through the double-walled side wall 17.

Both cooling circuits 18-19 are mounted above each other. The lower cooling circuit 18 provides for the cooling of the major part of side wall 17, whereas the upper cooling circuit 19 provides for the cooling of a relatively small part of side wall 17, whereby an intensive cooling action is achieved. In order to cool still more intensively side wall 17 of the upper part 1, or thus of the part where the hot gses flow into the apparatus, the above-mentioned cooling fins 20 are provided.

Said cooling fins 20 are traversed by the cooling medium of the upper cooling circuit 19. For that purpose, the latter consists of superposed annular chambers 25-26, which are connected by the fins 20 that are hollow. The lower annular chamber 25 is connected with the inlet 22, whereas the upper annular chamber 26 is provided with the outlet 24.

Via the openings 27 and 28 said cooling fins 20 constitute the only junction between the lower and upper annular chambers 25 and 26 respectively.

The hollow fins 20 run preferably downward according to a relatively strongly sloping helix, which in the downward direction has the same sense of rotation as that of the fan.

Finally, at the bottom of the funnel-shaped end 2 of vessel 1 there is a filter 29 for separating solid matter from a liquid by filtration. The filtered liquid leaves the filter via pipe 30, whereas the residual product can be discharged occasionally through a pipe 31.

Naturally, any type of suitable filter known by itself can be used. So, amongst others, use can be made of a filter 29 wherein the residual product can pile up, which filter has to be cleaned periodically.

The operation of the apparatus according to the present invention is the following.

The hot flue gases flow through the supply tube 6 and the inlet opening 5 into vessel 1. The temperature of these gases should amount to at least 120° C. in order to avoid corrosion by sulphur and condensation in the part of any installation preceding this apparatus.

Then the flue gases hit the circular plate 12 of the then rotating fan 11 and by the blades 13 are forced toward the side walls 17. By the forced motion imposed to the flue gases, the large dust particles as well as the smallest dust particles contained in the flue gases are driven against side wall 17.

Simultaneously therewith condensed moisture originating from the condensation of vapours contained in the flue gases forms as a result of the flue gases coming into contact with the cooled side wall 17. This condensed moisture being water for the major part provides for the permanent presence of a water film on side wall 17.

Apart from the fact that the large dust particles slide down along side wall 17 by gravity, this results in the very advantageous effect that the small dust particles are discharged too because they are carried along by the condensed water flowing down.

All dust particles as well as the condensed water get in the filter 29 where they are separated again from one another. Meanwhile the flue gases describe a downward helical motion along side wall 17 the return centrally upward into vessel 1, where they disappear through the outlet opening 15 and are discharged through the lagged flue 16.

Moreover, the invention provides the desulphurisation, or more specifically, the neutralisation of the acids formed from the sulphur contained in the flue gases. For that purpose, a base, e.g. ammonia, in the form of an aqueous solution is added to the flue gases through the inlet 14 in the supply tube 6. This base reacts with the acids present in the flue gases so as to form a harmless neutral product. It is of importance therein that the apparatus according to the present invention in consequence is not corroded by said acids.

The operation of the cooling circuits simply appears from the figures.

Naturally, the countercurrent principle is observed here. As has already been explained above, preferably two cooling circuits 18-19 are used in order to make the cooling as efficient as possible. Further, it has to be remarked that the use of helical cooling fins is more advantageous than the use of vertical fins, because with the former, which are partly bent in the flow direction of the gases, the deleterious turbulence of the flue gases is avoided.

It is clear that in this way an apparatus for the treatment of flue gases is obtained which is very universal and by means of which not only heavy dust particles but also light dust particles are removed from the flue gases and wherein also the neutralisation of acids that are objectionable to the environment is provided for.

Obviously, the invention can be carried out in many modified forms without departing from its scope. So, the inlet opening 5 and the outlet opening 15 optionally could be provided at other places; the blades 13 of fan 11 could be curved; there could be cooling fins 20 having another shape, or there could be no cooling fins at all; another filter or no filter 29 at all could be used.

Of course, the means that provide for forcing the flue gases toward the side wall 17 can be other means than a fan 11 or the like.

Figure 2:
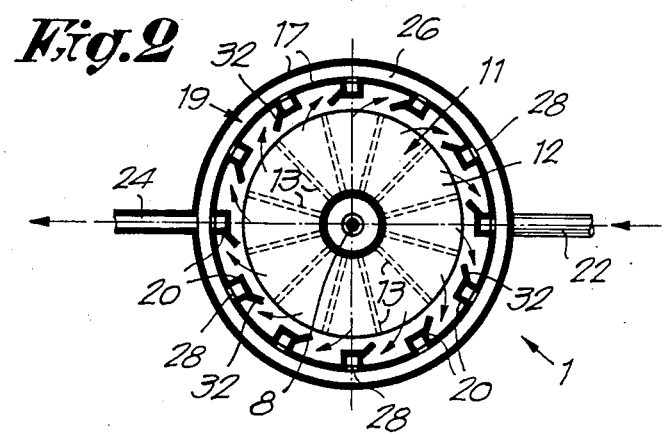
FIG. 2 represents a section according to line II—II in FIG. 1. 'de

Preferably, the cooling fins 20 are equipped with inclined fins 32 extending very closely to fan 11 in order to realize a still better guidance of the flue gases and to inevitably guide them against the cooled parts. For clarity's sake, the fins 32 are represented in FIG. 2 only.

It is also clear that the cooling of the side wall 17 can take place in a number of ways. So, e.g., for the sake of simplicity, only one cooling circuit could be provided instead of two. On the other hand, the water cooling could be replaced by an air cooling.

Optionally and in addition, a water supply can be provided if the flue gases do not contain enough vapour for creating a water film by condensation on side wall 17. Said supply can occur, e.g., through a supplementary inlet in the supply tube 6.

The present invention is by no means limited to the embodiment described as an example and represented in the accompanying drawings, but such an apparatus for treating flue gases can be realized in many forms and in any dimensions without departing from the scope of the invention.

I claim:

1. An apparatus for removing dust from flue gases, comprising:
   a substantially upright vessel having a top and a generally cylindrical wall;
   means for cooling the inner surface of the wall;
   an inlet port substantially centrally located in the top of the vessel, the inlet port for introducing flue gases into the vessel;
   fan means provided in the vessel for forcing the introduced flue gases radially outwardly toward the inner surface of the generally cylindrical wall;
   a number of hollow cooling fins provided on the inner surface of the generally cylindrical wall, the hollow cooling fins being traversed by a cooling liquid and extending helically on the inner surface of the vessel in the same direction as the direction of rotation of the fan means; and
   an outlet port for outletting the dedusted flue gases and having an inlet opening located substantially centrally of the vessel and spaced relatively closely below the fan means for forcing the introduced flue gases, whereby flue gas is introduced through the inlet port into the vessel and is forced radially outwardly by the fan means into contact with the inner wall surface of the vessel so that dust and flue gas separated during contact of the flue gas with the inner wall surface and the dedusted flue gases are outletted through the outlet port.

2. An apparatus according to claim 1, wherein said fan means is formed by two circular plates that are interconnected by a plurality of radial blades that are perpendicular to said plates.

3. An apparatus according to claim 1, wherein the means for cooling said inner surface comprises two separate cooling circuits that are spaced from each other in the axial direction of the vessel, so that one circuit forms an upper circuit and the other circuit forms a lower cooling circuit.

4. An apparatus according to claim 3, wherein the upper cooling circuit comprises two annular chambers that are spaced from each other in the axial direction of the vessel, an inlet for the cooling medium is provided on one chamber, an outlet for the cooling medium is provided on the other chamber, and both annular chambers are interconnected at the inner surface of the generally cylindrical wall of the vessel by said hollow cooling fins.

5. An apparatus according to claim 1, wherein the outlet port for discharging components removed from the treated flue gases comprises a filter for separating dust particles from liquid.

6. An apparatus for removing dust from flue gases, comprising:

a substantially upright vessel having a top and a generally cylindrical wall;

means for cooling the inner surface of the wall, comprising two separate cooling circuits that are spaced from each other in axial direction of the vessel, so that one circuit forms an upper cooling circuit and the other circuit forms the lower cooling circuit, the upper cooling circuit comprising two annular chambers that are spaced from each other in axial direction of the vessel, an inlet for the cooling medium being provided on one chamber, an outlet for the cooling medium being provided on the other chamber, and both annular chambers being interconnected at the inner surface of the generally cylindrical wall of the vessel by hollow cooling fins;

an inlet port substantially centrally located in the top of the vessel, the inlet port for introducing flue gases into the vessel;

fan means provided in the vessel for forcing the introduced flue gases radially outwardly toward the inner surface of the generally cylindrical wall; and an outlet port for outletting the dedusted flue gases and having an inlet opening located substantially centrally of the vessel and spaced relatively closely below the fan means for forcing the introduced flue gases, whereby flue gas is introduced through the inlet port into the vessel and is forced radially outwardly by the fan means into contact with inner wall surface of the vessel so that the dust and the flue gas are separated during contact of the flue gas with the inner wall surface and the dedusted flue gases are outletted through the outlet port.

7. An apparatus according to claim 6, wherein the inner surface of the generally cylindrical wall is provided with a number of cooling fins.

8. An apparatus according to claim 7, wherein said cooling fins are hollow and are traversed by a cooling liquid.

9. An apparatus according to claim 8, wherein said cooling fins extend helically on the inner surface of the vessel in the same direction as the direction of rotation of said fan means.

10. An apparatus according to claim 9, wherein said cooling fins are provided with inclined wings.

* * * * *